3,265,702
NOVEL XANTHENE-9-CARBOXYLIC ACID ESTERS OF HYDROXYALKYL AZASPIRANES
Meier E. Freed, Philadelphia, Pa., and Leonard M. Rice, Minneapolis, Minn., assignors to American Home Products Corporation, New York, N.Y., a corporation of Delaware
No Drawing. Filed July 10, 1963, Ser. No. 294,139
5 Claims. (Cl. 260—294.3)

This invention relates to certain novel chemical compounds useful as central nervous system moderators. More particularly it relates to a novel class of xanthene-9-carboxylic acid esters of hydroxyalkyl azaspiranes which exert anticholinergic and antitremorine effects in mammals.

The invention further involves methods for the manufacture of these esters and certain intermediates prepared in the synthesis of such end products, as well as the use of the final ester products in pharmacology.

The invention in its primary product aspect therefore concerns a series of novel xanthene-9-carboxylic acid esters of hydroxyalkyl azaspiranes which may be generally represented by the following structural formula:

(I)
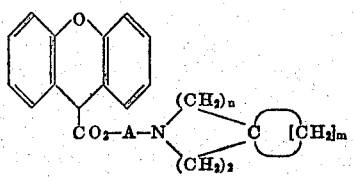

and the pharmaceutically acceptable acid addition salts thereof wherein A represents a polymethylene radical, preferably a dimethylene or trimethylene radical, which may in some cases be lower alkyl substituted; n is either 1 or 2 while m is a positive integer extending from 4 to 7.

The compounds of our invention may be prepared as either the base form shown above or the neutral acid addition salt form obtained by reaction of the base form with a pharmaceutically acceptable nontoxic acid which may be either an inorganic or organic acid. Any suitable inorganic acid such as hydrochloric, sulfuric or phosphoric and the like or organic acids such as acetic, maleic or critic may be used to prepare the acid salt. Also included within the broad scope of the novel compounds which comprise the prime product aspect of the invention are the quarternary salts of the aforesaid bases such as the methohalides and methosulfates obtained by treatment of the base with reagents such as methyl iodide and methyl sulfate.

The compounds of the present invention may be prepared by more than one method of synthesis. However, we prefer to employ the method outlined in the following illustrative reaction scheme for the preparation of 3-(3-azaspiro[5,5]undec-3-yl)propylxanthene-9-carboxylate:

(A)
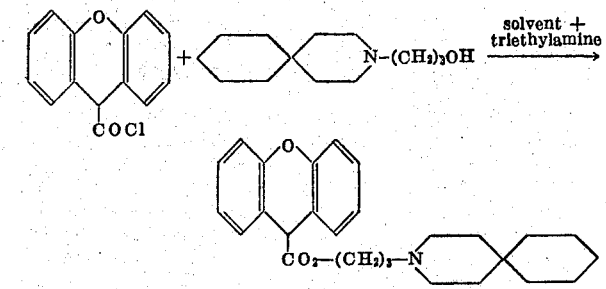

In the above reaction the known reagent xanthene-9-carbonylchloride in a suitable organic reaction solvent such as methylene dichloride is added to a mixture of a suitable hydroxyalkyl azaspirane and a trialkylamine, in this particular case the azaspirane being 3-(3-hydroxypropyl)-3-azaspiro[5.5]undecane and the amine being triethylamine, both taken up in the same reaction solvent as that employed for the other reactant. It should be understood that any one of a series of similar azaspiranes may be employed in place of the one disclosed in the above reaction. The approximate scope of the azaspirane reactant may be easily determined from the scope of the azaspirane moiety of the reaction product obtained. After combination of the reactants the mixture is refluxed overnight, the reaction temperature being limited by the refluxing temperature of the organic reaction solvent employed. When the reaction has gone to completion the crude product obtained is purified by conventional techniques such as saline wash, ether extractions, and the like to obtain the product of the invention.

Alternatively one may prepare the novel compounds of the invention by a somewhat different reaction involving different starting materials in the manner illustrated by the preparation of 2-(3-azaspiro[5.5]undec-3-yl]ethyl)-xanthene-9-carboxylate which follows:

(B)
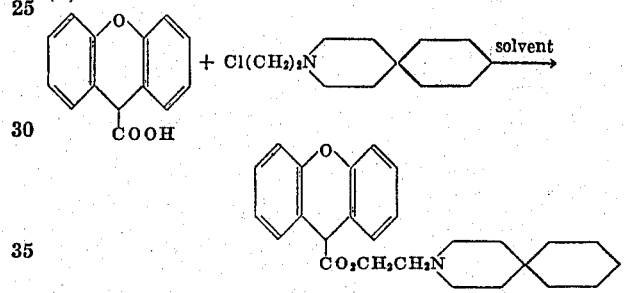

In the above reaction a solution of the known reagents xanthene-9-carboxylic acid and a suitable chloroethylazaspirane compound in a suitable polar solvent such as isopropanol are refluxed for a varying reaction period depending upon the reaction temperatures and specific reactants involved, but generally from about 4 to 6 hours' duration, which is normally sufficient to complete reaction.

Although in the above reaction A the organic reaction solvent employed is methylene dichloride, it must be understood that the solvent is merely exemplary of a number of suitable organic solvents such as benzene, acetone, hexane, toluene, and the like which may be equally useful in the reaction.

In reaction B, however, a polar solvent generally is desired to promote the reaction. An example of such solvents frequently used are organic alcohols such as normal or isopropanol, acetonitrile, and the like.

In a similar manner the use of triethylamine in the preparation A above is not intended to be critical, since other mild bases such as diethylene diamine, trimethylamine, pyridine, and the like may also be employed.

For therapeutic purposes the bases of general Formula I may be employed as such or in the form of their acid addition salts, it being understood that only those such salts should in practice be employed as contain anions that are relatively innocuous to the animal organism when used in therapeutic doses in order that the desirable effects are not vitiated by the side effects, if any, ascribable to those anions.

The compounds of the present invention can be prepared and administered to mammals, i.e., humans and animals, in a wide variety of oral and parenteral dosage forms, singly or in combination with other coacting compounds. They can if desired be associated with a carrier which can be a solid material or a liquid in which the compound is dissolved, dispersed, or suspended. The solid compositions can take the form of tablets, powders, capsules, pills, or the like, preferably in unit dosage forms for simple administration or precise dosages. The liquid composition can take the form of solutions, emulsions, suspensions, syrups, or elixirs. Such conventional solid carriers as sucrose, starches, etc., or liquid vehicles such as non-toxic alcohols, glycerine, or the like may be thus used.

When so administered by oral or intraperitoneal routes in doses of from 5 to 200 mg./kg. of body weight to laboratory animals demonstrating nervous tremors, the compounds of the invention will moderate and alleviate these effects. Moreover, their utility, in addition to the specific areas noted, also extends to the general area of veterinary medicine as well as to experimental pharmacology, where they are useful as agents in testing and evaluation of various central nervous system moderators.

The following examples will serve to further illustrate the invention in its various products and process aspects. Since the scope of the invention may only be determined by the definition of the invention expressed in the several appended claims, it must be understood that these several examples are purely exemplary of the invention and are not intended to limit its concept in any manner.

EXAMPLE 1

*3-(3-azaspiro[5.5]undec-3-yl)propyl-xanthene-9-carboxylate*

Add a solution of xanthene-9-carbonyl chloride (5 g., 0.02 mole) in 50 ml. of methylene dichloride to 4.1 g. (0.02 mole) of 3-(3-hydroxypropyl)-3-azaspiro[5.5]undecane and 2.8 ml. of triethylamine in 100 ml. of the same solvent. Make the addition slowly and with stirring. Reflux the mixture overnight, cool, and wash with saline. Dry the organic phase, filter, and concentrate under reduced pressure. Extract the residue with ether and acidify it with ethanolic hydrogen chloride. Filter off the product and recrystallize from methanol-ether; M.P. 203–203.5° C.

*Analysis.*—Calcd. for $C_{27}H_{34}ClNO_3$: C, 71.15; H, 7.51; Cl, 7.82; N, 3.07. Found: C, 71.62; H, 7.45; Cl, 8.15; N, 3.11.

EXAMPLE 2

*2-(3-azaspiro[5.5]undec-3-yl)ethyl-xanthene-9-carboxylate*

Reflux a solution of 3-(2-chloroethyl)-3-azaspiro[5.5]-undecane (from 5 g. of the hydrochloride) and 4.5 g. of xanthene-9-carboxylic acid·(0.02 mole) in 60 ml. of 2-propanol for about 4 hours. Distill off the solvent under reduced pressure. Crystallize the residue from acetone. After recrystallization from methanol-acetone it melts at 207–208° C.

*Analysis.*—Calcd. for $C_{26}H_{32}ClNO_3$: C, 70.65; H, 7.23; N, 3.17; Cl, 7.92. Found: C, 70.70; H, 7.56; N, 3.26; Cl, 8.18.

EXAMPLE 3

*2-(2-azaspiro[4.7]dodec-2-yl)ethyl-xanthene-9-carboxylate*

Reflux a solution of 2(2-chloroethyl)-2-azaspiro[4.7]-dodecane (from 5 g. of the hydrochloride) and 4.5 g. of xanthene-9-carboxylic acid in 60 ml. of 2-propanol for about 4 hours. Follow the same purification technique disclosed in preceding Example 2 to obtain the product of this example.

EXAMPLE 4

*2-(8-azaspiro[4.5]dec-8-yl)ethyl xanthene-9-carboxylate*

Reflux a solution of 8-(2-chloroethyl)-8-azaspiro[4.5]-decane (from 5 g. of the hydrochloride salt) and 4.5 g. of xanthene-9-carboxylic acid in 60 ml. of 2-propanol for about 4 hours. Follow the purification technique outlined in preceding Example 2 on the product obtained to obtain the product of this example.

EXAMPLE 5

*2-(2-azaspiro[4.4]non-2-yl)ethyl xanthene-9-carboxylate*

Reflux a solution of 2(2-chloroethyl)-2-azaspiro[4.4]-nonane (from 5 g. of the hydrochloride salt) and 4.5 g. of xanthene-9-carboxylic acid in 60 ml. of 2-propanol for about 4 hours. Follow the purification technique outlined in preceding Example 2 on the product obtained to obtain the product of this example.

EXAMPLE 6

*2-(3-azaspiro[5.5]undec-3-yl)-1-methylethyl xanthene-9-carboxylate*

Follow the precedure outlined in the preceding Example 1 except to substitute the reactant 3-(2-hydroxypropyl)-3-azaspiro[5.5]undecane for the reactant 3-(3-hydroxypropyl)-3-azaspiro[5.5]undecane disclosed therein and you will obtain the corresponding isomer thereof.

EXAMPLE 7

*3-(3-hydroxypropyl)-3-azaspiro[5.5]undecane*

A. 3-(3-HYDROXYPROPYL)-3-AZASPIRO[5.5] UNDECANE-2,4-DIONE

Heat a mixture of 3-hydroxypropylamine (1 mole) and cyclohexane diacetic anhydride (1 mole) under reflux for 2 hours in 25 ml. of water. Evaporate the solution to a small volume and place in a distillation flask. Heat the mixture in an oil bath to 180–200° till evolution of water ceases. Distill the product at 159–160° at 0.025 mm. of mercury.

*Analysis.*—Calcd. for $C_{13}H_{21}NO_3$: C, 65.24; H, 8.85; N, 6.02. Found: C, 65.16; H, 8.85; N, 5.85.

B. 3-(3-HYDROXYPROPYL)-3-AZASPIRO[5.5]UNDECANE

Add slowly a solution of 3-(3-hydroxypropyl)-3-azaspirol[5.5]undecane-2,4-dione (12 gm., 0.05 mole) in anhydrous ether to a stirring and refluxing suspension of lithium aluminum hydride (2.8 gms., 0.1 mole) in anhydrous ether (250 ml.). Reflux 12 hours, cool, decompose by the careful addition of water and filter. Concentrate the filtrate and distill the product. B.P. 92–96° at 0.075 mm.

*Analysis.*—Calcd. for $C_{13}H_{25}NO$: C, 73.88; H, 11.92; N, 6.63. Found: C, 73.65; H, 11.82; N, 6.74.

In a similar manner like hydroxyalkyl and haloalkyl substituted 3-azaspiro[5.5]undecanes may be prepared for use by selection of a suitably substituted amine in part A for reaction with the proper cycloalkyl acid anhydride to obtain the correct dione which is transformed to the final product in the manner indicated. In such fashion a compound such as 3-(2-hydroxyethyl)-3-azaspiro[5.5]undecane, 3-[3-hydroxypropyl]-3-azaspiro[5.5]undecane, or 3-(2-chloroethyl)-3-azaspiro[5.5]undecane, or 3-[3-chloroethyl]-3-azaspiro[5.5]undecane may be obtained either initially or by simple halogenation in some cases involving the latter compounds. The nonane, decane and dodecane analogs may of course be prepared in the same manner.

We claim:

1. 3-(3-azaspiro[5.5]undec-3-yl)propyl xanthene-9-carboxylate.

2. 2-(3-azaspiro[5.5]undec-3-yl)ethyl xanthene-9-carboxylate.

3. A compound of the formula:

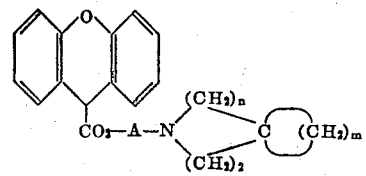

and the pharmaceutically acceptable acid addition salts thereof, wherein A represents alkylene having from 2 to 4 carbon atoms; $n$ is an integer from 1 to 2, and $m$ is an integer from 4 to 7.

4. A compound of the formula:

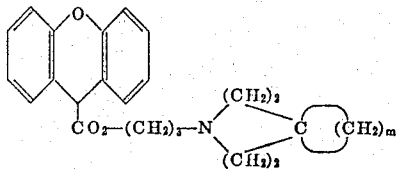

and the pharmaceutically acceptable acid addition salts thereof, wherein $m$ is an integer from 4 to 7.

5. A compound of the formula:

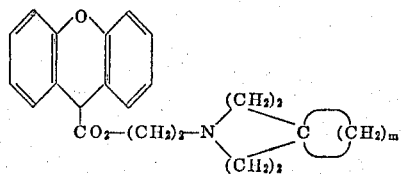

and the pharmaceutically acceptable acid addition salts thereof, wherein $m$ is an integer from 4 to 7.

References Cited by the Examiner

UNITED STATES PATENTS 3,184,467  5/1965  Dold et al. _____ 260—294.3

ALEX MAZEL, *Primary Examiner.*

HENRY R. JILES, JOSE TOVAR,
*Assistant Examiners.*